Figure 1:
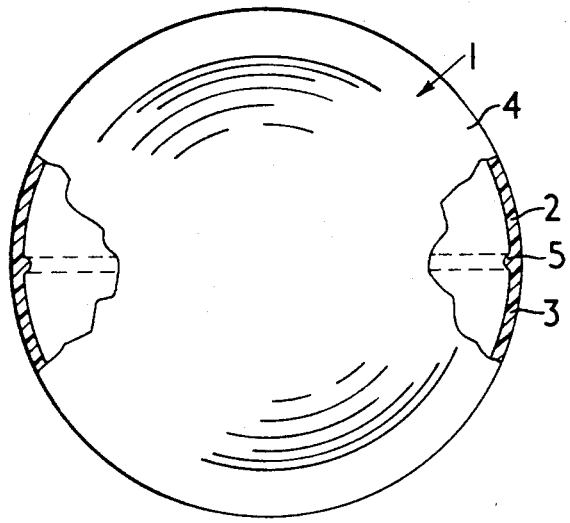
Figure 2:
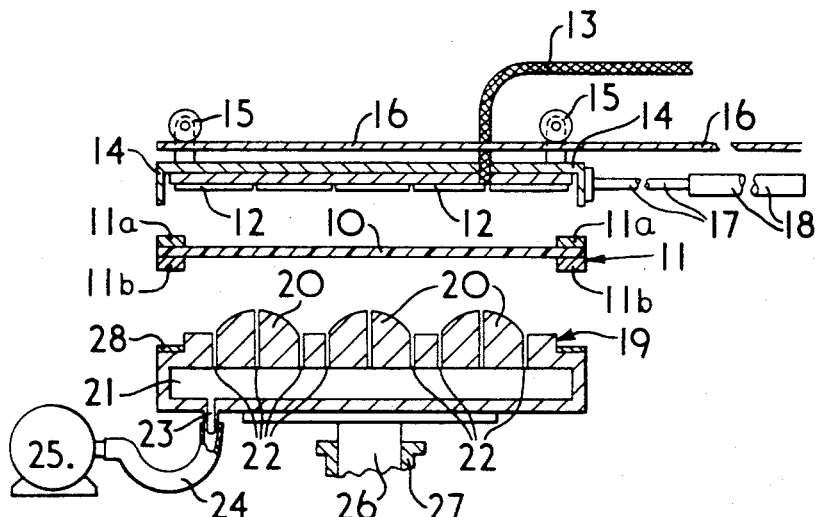
Figure 3:
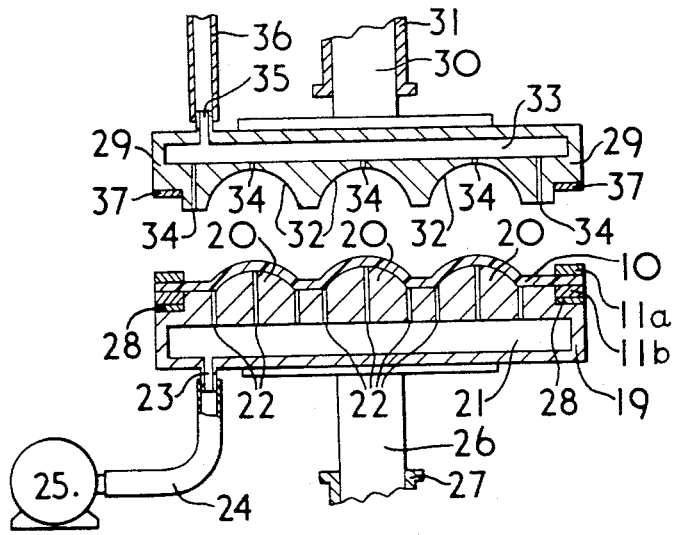
Figure 4:
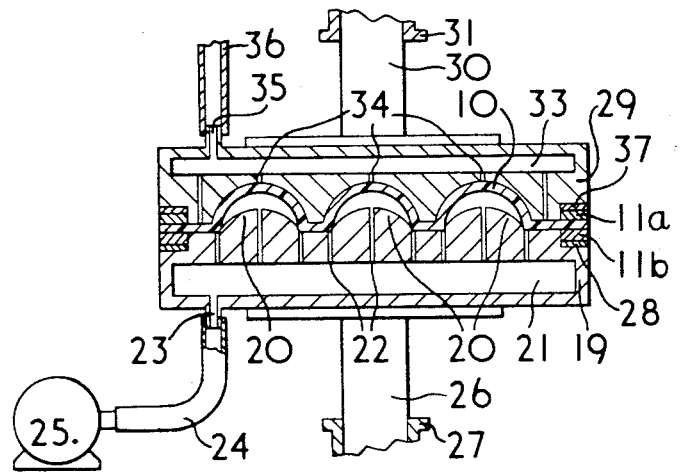
Figure 5:
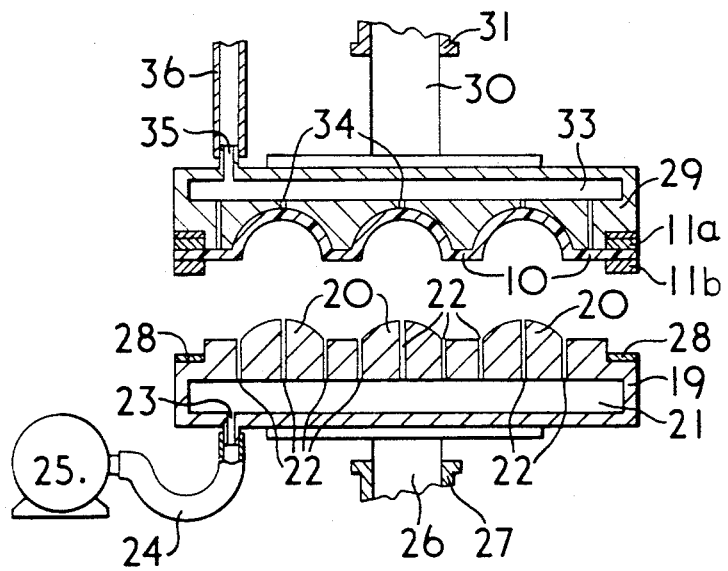

Nov. 19, 1968  J. JONES-HINTON ET AL  3,411,974
APPARATUS FOR FORMING HOLLOW PLASTIC ARTICLES
Filed Oct. 4, 1965                                4 Sheets-Sheet 1

Inventors
James Jones-Hinton
Thomas E. H. Gray
Stevens, Davis, Miller & Mosher
Attorneys Inventors
James Jones-Hinton
Thomas E. H. Gray Stevens, Davis, Miller & Mosher
Attorneys

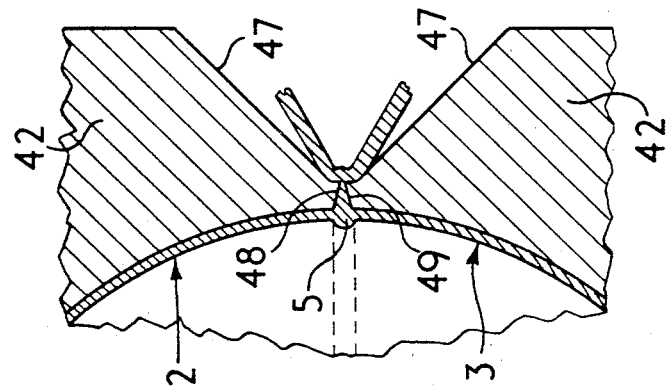
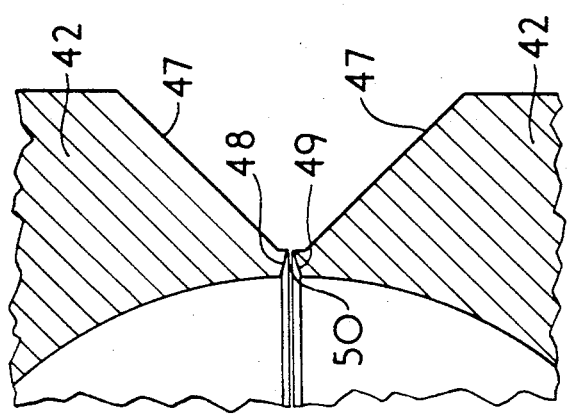

United States Patent Office 3,411,974
Patented Nov. 19, 1968

3,411,974
APPARATUS FOR FORMING HOLLOW
PLASTIC ARTICLES
James Jones-Hinton, Tanworth-in-Arden, and Thomas E.
H. Gray, Sutton Coldfield, England, assignors to The
Dunlop Company Limited, London, England, a British
company
Filed Oct. 4, 1965, Ser. No. 492,487
Claims priority, application Great Britain, Oct. 14, 1964,
41,827/64
16 Claims. (Cl. 156—380)

This invention relates to an apparatus for forming hollow plastic articles, and particularly to an apparatus for forming table-tennis balls.

According to the present invention an apparatus for forming a table-tennis ball comprises a pair of electrodes each comprising an open-ended cylinder having an internal diameter at the open end equal to the external diameter of a table-tennis ball, the cylinders being arranged so that the open ends thereof are directly opposed, means to connect the electrodes to a source of a high frequency alternating electric current, and means to reduce the separation of the electrodes during passage of the high frequency alternating electric current between the electrodes.

The apparatus is used to form table-tennis balls by joining together two sheets of a thermoplastic material each of which is shaped to provide one or more hemispherical projections on one surface thereof. The two shaped sheets are superimposed so that the hemispherical projections on the sheets are aligned to form a substantially spherical cavity, and the sheets are then united in the regions forming the edges of the hemispherical projections on the sheets to form a butt joint between the hemispherical projections.

The superimposed sheets are assembled in the apparatus so that one electrode of the pair of electrodes contacts one surface of the superimposed sheets and the other electrode contacts the opposite surface of the superimposed sheets. The electrodes are directly opposed and are separated by a distance equal to the thickness of the superimposed sheets, and each electrode accommodates a hemispherical projection on the sheets to be united, i.e. the open end of the cylinder forming an electrode contacts the sheet in the regions forming the base of the hemispherical projection. A high frequency alternating electric current is then passed between the electrodes to soften the material, and during passage of this current the separation of the electrodes is reduced. In this way, the sheets are united and the hemispherical projections on the sheets are joined by means of a butt joint to form a table-tennis ball.

Usually, more than one pair of electrodes will be provided so that more than one table-tennis ball can be formed in a single welding operation. In this case two sheets of a thermoplastic material are united, each sheet being shaped so that it has a number of hemispherical projections on one surface and the disposition of the pairs of electrodes in the welding apparatus corresponds to the disposition of the hemispherical projections on the sheets to be united.

The electrodes may conveniently be mounted on base plates, one member of each pair of electrodes being mounted on one base plate and the other member of each pair being mounted on the other base plate. This construction is advantageous in that the base plate, rather than each individual electrode, can be connected to the source of high frequency electric current. The projections on the base plates should be shaped so that, when the apparatus is in use, the hemispherical projections on the sheets of thermoplastic material are accommodated within the hollow projections on the base plate. Usually, the whole of each projection will comprise an electrode, but if desired, only the open end portion of each projection need be an electrode. The projections are disposed so that the open ends of each pair of projections are directly opposed. The electrodes (or the base plates) are connected to a source, such as a generator, of a high frequency alternating electric current. Current of up to 75 megacycles will usually be used. The projections on the base plates are usually cylindrical in shape, and in this case, the whole of each cylinder can conveniently form the electrode. The projections are usually of a length substantially equal to the diameter of a table-tennis ball, and each projection can be hollow or it can be provided with a core having in its end a hemispherical cavity of a size substantially equal to the external dimensions of a hemispherical half of a table-tennis ball. The core may be made of an insulating material, or it can be made of the same material as the projections; for example the projection may be a solid cylinder having a hemispherical cavity formed in its free end.

Means are provided for reducing the separation of the electrodes during passage of the high frequency electric current, and this means can conveniently be a plunger attached to one of the base plates and slidable within an air cylinder. The plunger can be operated pneumatically.

As the thermoplastic material becomes softened by the passage through it of the high frequency alternating electric current, the separation of the electrodes is reduced, and thus the softened material between the electrodes is forced outwardly from between the electrodes. If the opposed faces of the electrodes are parallel, then the same amount of softened material will be forced outwardly at each side of the gap between the electrodes as these move closer together. However, if the opposed surfaces of the electrodes are at an angle with respect to each other so that the gap between them has a substantially V-shape, then a greater amount of the material will be forced outwardly from one side of the gap than the other side. This greater amount of material will be forced outwardly of the widest side of the gap between electrodes, and by varying the angle between the opposed surfaces of the electrodes, the amount of softened material forced outwardly at each side can be controlled.

By arranging the opposed faces of the electrodes at an angle with respect to each other, it is possible, as described above, to force a controlled amount of the softened material into the interior of the ball to form a reinforcing bead on the internal surface of the joint.

Usually, the angle between the opposed faces of the electrodes will be from ½° to 7°, preferably about 3°.

The apparatus of the present invention can be used in the latter stages in the method for the manufacture of a table-tennis ball described and claimed in our copending British patent application No. 41,828/64, filed Oct. 14, 1964. In this copending British patent application No. 41,828/64, the U.S. equivalent patent application, of which is Ser. No. 492,487, filed Oct. 4, 1965, there is described and claimed a method for the manufacture of a table-tennis ball which comprises heating a sheet of a rigid thermoplastic material having a power loss factor of at least 0.01 when measured at room temperature using an alternating electric current of 1 megacycle frequency, until the sheet is softened sufficiently to enable it to be vacuum-formed, shaping the softened sheet by vacuum-forming to produce one or more hemispherical cavities in the sheet, assembling two shaped sheets so that the hemispherical cavities therein are aligned to form one or more substantially spherical cavities, and subjecting the assembled sheets to a high frequency alternating electric current in the regions forming the edges of the hemispherical cavities to cause said edges to soften and become adhered together.

The shaping of the sheet of a rigid thermoplastic material can be effected by any vacuum-forming technique, but the preferred technique is a two-stage process, the first stage comprising forming the sheet into a domed shape to about half its final moulded height, and the second stage comprising completing the forming operation. A suitable two-stage method is described and claimed in our co-pending British patent application No. 1,607/65, in which there is described and claimed a method for the manufacture of a hemispherically-shaped article of a thermoplastic material by the method of vacuum-forming, which comprises heating a single sheet of a thermoplastic material until it has softened sufficiently to enable it to be vacuum-formed, applying to one surface of the softened sheet a first forming tool having a shape to form said sheet into domed form and to a height which is substantially one-half of its final moulded height, creating a pressure-differential on opposite sides of the sheet to cause said sheet to be moved into forming contact with said first forming tool, applying to the surface of the sheet remote from said first forming tool a second forming tool having a shape to form the domed sheet into its final hemispherically shaped form, and creating a pressure-differential on opposite sides of the sheet to cause said sheet to be moved into forming contact with said second forming tool, the first forming tool being a male forming tool or a female forming tool and the second forming tool being a female forming tool or a male forming tool respectively.

The first forming tool is heated during the vacuum-forming operation to a temperature of up to about 120° C. depending upon the particular material to be vacuum-formed, and the second forming tool is maintained at a low temperature to set the shaped sheet rapidly after the second vacuum-forming operation. Preferably, the first forming tool is a male forming tool and the second forming tool is a female forming tool.

The table-tennis balls which can be made using the apparatus of the present invention consist of two hemispherically shaped halves joined together by means of a butt-joint. The table-tennis balls can be made of any thermoplastic material which can be softened by subjecting it to a high frequency alternating electric current, and suitable thermoplastic materials are those materials having a power loss factor of at least 0.01 when measured at room temperature using an alternating electric current of 1 megacycle frequency. Preferably, the material has a power loss factor of at least 0.04 when measured under the given conditions.

Examples of suitable thermoplastic materials for forming table-tennis balls using the apparatus of the invention are rigid polyvinylchloride, terpolymers of acrylonitrile with butadiene and styrene, highly crystalline copolymers of ethylene with propylene, polypropylene, copolymers of diphenpylolpropane and epichlorhydrin, high density polyethylene, polyamides such as nylon, and polycarbonates. Cellulose nitrate may be used but since this material is inflammable it may be desirable to exclude air from the apparatus and to work in an atmosphere of nitrogen. It is preferred to use a non-inflammable material.

It is to be understood that by the term "table-tennis ball" as used in this specification there is meant a hollow ball suitable for playing the game of table-tennis, or ping-pong, being not less than 11.00 cms. and not more than 12.00 cms. in circumference, weighing not less than 2.00 and not more than 3.00 gms., and being not more than 0.050 cms. out of sphericity as measured by the difference between the largest and the smallest diameters.

Figure 6:
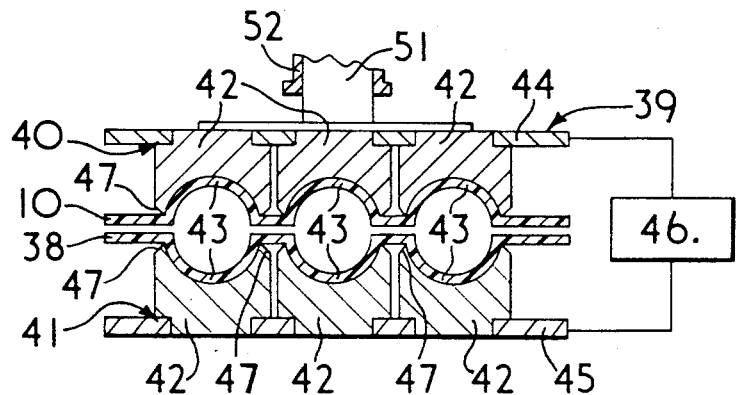

An apparatus constructed and arranged in accordance with the present invention, and a method for the manufacture of a table-tennis ball will now be described by way of example only with reference to the accompanying drawings, in which:

FIGURE 1 shows a table-tennis ball which can be made using the apparatus of the present invention, FIGURES 2 to 5 inclusive illustrate various stages in the production of the shaped sheets of a thermoplastic material by vacuum-forming, FIGURE 6 shows an apparatus for welding two halves of the ball, FIGURE 7 shows in detail, the construction of the electrodes in the apparatus shown in FIGURE 6, and FIGURE 8 illustrates the method of welding the two halves of the ball using the electrodes shown in FIGURE 7.

As shown in FIGURE 1, a table-tennis ball 1 is formed from the thermoplastic material and consists of a sphere which was formed by butt-joining two halves 2 and 3. The table-tennis ball 1 has a smooth outer surface 4 and the walls are of substantially uniform thickness. On its internal surface the table-tennis ball 1 is provided with a reinforcing bead 5 at the position of the butt-joint between the two halves to strengthen this butt-joint.

Various stages of the method of shaping the sheets of a thermoplastic material in the manufacture of the table-tennis ball are shown in FIGURES 2 to 5 and the general method for the manufacture of such a ball is as follows:

A sheet 10 having the desired thickness and made of the appropriate thermoplastic material is clamped around its periphery by a peripheral clamp 11 formed of an upper clamping member 11a and a lower clamping member 11b. An electric heating unit 12 (shown only in FIGURE 2) supplied with electric current via a cable 13 is positioned above the clamped sheet 10. The electric heating unit 12 is mounted in a carriage 14 which is suspended on wheels 15 to be movable along a rail 16. The carriage 14 is attached to a push-pull bar 17, the operation of which through a cylinder 18, causes movement of the carriage 14 together with the heating unit 12 to and from a position above the sheet 10.

A male forming tool 19 having a number of projections 20 on its surface is positioned beneath the clamped sheet 10. Each projection 20 has a shape of a minor segment of a sphere, the diameter of the base of each projection 20 being substantially equal to the internal diameter of a table-tennis ball, and the height of each projection 20 being substantially equal to one-quarter of the internal diameter of the table-tennis ball. The male forming tool 19 has a cavity 21 which connects via small holes 22 with the surface of the shaping former 19 carrying the projection 20. An outlet 23 is provided from the cavity 21 which outlet 23 is connected via a pipe 24 to a pump 25 to effect withdrawal of air from the cavity 21 and through the small holes 22. The male forming tool 19 is mounted on a bar 26 slidable in the cylinder 27 to effect vertical movement of the male forming tool 19 to and from the clamped sheet 10.

The sheet 10 is heated by the heating unit 12 until it is softened sufficiently to enable it to be vacuum-formed and the heating unit 12 mounted in carriage 14 is then moved from the position above the shaped sheet 10 by operation of the push-pull bar 17. The male forming tool 19 is then moved upwardly into contact with the softened sheet 10 by effecting upward movement of the bar 26 in the cylinder 27. Preferably, the male forming tool 19 is maintained at an elevated temperature during this process, for instance 50° C. to 120° C. The periphery of the surface of the male forming tool 19 carrying the projections 20 is provided with a strip 28 of resilient material which effects an airtight seal with the clamp 11 and when this has been effected, air is withdrawn by pump 25 from the chamber 21 through the small holes 22 so that the soft sheet 10 is caused to conform to the shape of the surface of the forming tool 19.

A female forming tool 29 mounted on a bar 30 slidable within a cylinder 31 is moved into a position above the shaped sheet 10 which is held in contact with the forming tool 19. The female forming tool 29 has a number of hemispherical cavities 32 in its shaping surface and these cavities 32 are arranged to correspond to the projections 20 on the surface of the male forming tool 19. The hemispherical cavities 32 are of a size substantially equal to the external dimensions of half of a table-tennis ball. The female forming tool 29 is provided with an internal cavity 33 which is connected to the shaping surface through small holes 34 and the cavity 33 is provided with an outlet 35 which is connectable via a tube 36 to means to withdrawn air from the cavity 33 and through the small holes 34. The periphery of the shaping surface of the female forming tool 29 is provided with a resilient strip 37 to form an airtight seal with the upper clamping member 11a. After the female forming tool 29 has been moved to a position adjacent the shaped sheet 10 and airtight engagement effected with the clamping member 11a, air is withdrawn from the cavity 33 while, at the same time, the air pressure in the cavity 21 of the male forming tool 19 is increased above atmospheric pressure. In this way, the sheet 10 which is still soft is caused to conform to the profile of the female forming tool. The female forming tool 29 is not heated to a temperature above room temperature during the shaping operation.

The male forming tool 19 is then removed from contact with the shaped sheet 10 which is held by suction in contact with the female forming tool 29 until the sheet has set sufficiently to be handled without deformation. The shaped sheet 10 is then removed from the female forming tool 29.

The apparatus for forming the table-tennis balls from the shaped sheets is shown in FIGURES 6 and 7.

Two shaped sheets 10 and 38 are placed in a welding apparatus 39 with their hemispherical cavities in alignment as shown in FIGURE 6. The welding apparatus 39 comprises two halves 40 and 41 for contacting the assembled shaped sheets 10 and 38 one on each surface of the assembly. Each half 40 and 41 has a number of opposed, cylindrical rod-like projections 42 corresponding to the number of hemispherical projections 43 on the shaped sheets 10 and 38 which are to be welded together and the end of each rod-like projection 42 is shaped to accommodate a projection 43 on the shaped sheet 10 or 38. The rod-like projections are mounted on base plates 44 and 45 and the projections 42 form electrodes when the base plates 44 and 45 are connected to a source 46 of high frequency alternating current so that the shaped sheets 10 and 38 are positioned between pairs of electrodes. The periphery 47 of the rod-like projections 42 is chamfered at the end adjacent the shaped sheet 10 and 38 so as to produce a line of high concentration of the alternating current. The end surfaces 48 and 49 of the rod-like projections 42 in a pair of opposed projections are shaped so that a V-shaped gap 50 is produced between opposed projections 42 as shown in FIGURE 7. The angle of the V-shaped gap 50 is about 3°.

The upper half 40 of the welding apparatus 39 is mounted on a bar 51 slidable in a cylinder 52 and when the source 46 of high frequency alternating current is connected to each half 40 and 41 of the welding apparatus, the bar 51 is moved to bring the upper half 40 of the welding apparatus closer to the lower half 41 so that only a very fine gap remains between opposed projections 42. This movement of the upper half 40 takes place as the sheets 10 and 38 are softened in the regions contacted by the electrodes due to passage of the high frequency current, and this movement of the electrodes 42 towards one another effects welding of the two hemispheres 43 where they contact one another and also forces some of the thermoplastic material into the interior of the table-tennis ball to form the reinforcing bead 5, as illustrated in FIGURE 8.

When the welding of the opposed hemispheres is completed, the high frequency current is switched off and the welded sheets are allowed to cool. The table-tennis balls so produced are removed from the excess sheet material adhering to them, and are then subjected to a process such as barrelling to produce the desired surface finish.

The apparatus shown in FIGURE 6 can, if desired, have electrodes having a different construction to those shown. In particular, the electrodes can be hollow, cylindrical projections, or they can be hollow, cylindrical projections which have a core of an insulating material. In this latter case, the core is shaped to produce a hemispherical cavity in the end of the projection.

It is sometimes desirable to raise the temperature of the thermoplastic material prior to passage of the high frequency electric current in order that the power loss factor of the material is increased. This can be effected by maintaining the apparatus at a controlled elevated temperature, which temperature should not be sufficient to cause the material to soften sufficiently to enable it to be deformed.

The apparatus of the present invention enables table-tennis balls to be manufactured easily and economically from thermoplastic sheet material such as polyvinyl chloride, and this is advantageous in that the apparatus can be operated without substantial risk of fire. Hitherto-fore, table-tennis balls have been made of cellulose nitrate and since this material is highly inflammable, extensive fire precautions have been necessary in the production of table-tennis balls.

The apparatus of this invention can be operated automatically, and can, if desired, be incorporated in an automatic process which comprises shaping sheets of thermoplastic material to produce a number of hemispherical projections on one surface thereof, forming table-tennis balls using the apparatus of this invention, finishing the table-tennis balls, and finally testing, grading, marking and packing the table-tennis balls.

Having now described our invention, what we claim is:

1. An apparatus for forming a table-tennis ball which comprises a pair of electrodes, each electrode comprising an open-ended cylinder having an internal diameter at the open end substantially equal to the external diameter of a table-tennis ball and the cylinders being arranged so that the open ends thereof are directly opposed, means to connect the electrodes to a source of a high frequency alternating electric current, and means to reduce the separation of the electrodes during passage of the high frequency alternating electric current between the electrodes.

2. An apparatus according to claim 1 in which more than one pair of electrodes is provided.

3. An apparatus according to claim 1 in which the electrodes comprise open-ended cylinders mounted on base plates, the cylinders in the pair of cylinders being attached one to each base plate to form a projection on one surface of the base plate.

4. An apparatus according to claim 3 in which said base plates are connectable to a source of a high frequency alternating electric current to connect said electrodes to the source of the high frequency current.

5. An apparatus according to claim 3 in which the whole of each cylindrical projection comprises an electrode.

6. An apparatus according to claim 3 in which the end-portion only of each cylindrical projection comprises an electrode.

7. An apparatus according to claim 1 in which each electrode comprises a hollow cylinder.

8. An apparatus according to claim 1 in which each electrode comprises a solid cylinder having in its end a hemispherical cavity of a size substantially equal to the external dimensions of half of a table-tennis ball.

9. An apparatus according to claim 7 in which each hollow cylinder is provided with a core having in its end a hemispherical cavity of a size substantially equal to the external dimensions of half of a table-tennis ball.

10. An apparatus according to claim 9 in which said core is made of an insulating material.

11. An apparatus according to claim 3 in which each cylindrical projection on the base plates has a length substantially equal to the external diameter of a table-tennis ball.

12. An apparatus according to claim 1 in which each cylinder is externally tapered towards its open end.

13. An apparatus according to claim 1 in which the immediately opposed surfaces of the electrodes are shaped to form a V-shaped gap between the electrodes.

14. An apparatus according to claim 13 in which said immediately opposed surfaces of the electrodes are inclined with respect to each other at an angle of from ½° to 7°.

15. An apparatus according to claim 14 in which said angle is about 3°.

16. An apparatus according to claim 1 in which the means to reduce the separation of the electrodes comprises a piston slidable within a cylinder and operable pneumatically.

References Cited

UNITED STATES PATENTS

| | | | |
|---|---|---|---|
| 1,263,141 | 4/1918 | Strauss | 156—292 X |
| 1,270,873 | 7/1918 | Robertson | 156—292 X |
| 1,531,505 | 3/1925 | Roberts | 156—228 |
| 1,575,388 | 3/1926 | Roberts | 156—292 X |
| 1,654,647 | 1/1928 | Heist | 156—228 X |
| 2,378,034 | 6/1945 | Perryman | 156—292 X |
| 2,597,704 | 5/1952 | Carlson | 156—245 |
| 2,975,823 | 3/1961 | Ponnock | 156—245 |
| 3,062,695 | 11/1962 | Hull | 156—306 X |
| 3,152,944 | 10/1964 | Mo Jonnier et al. | 156—498 |
| 3,350,252 | 10/1967 | Twickler | 156—245 X |

HAROLD ANSHER, *Primary Examiner.*